(12) United States Patent
Huang

(10) Patent No.: US 8,085,246 B2
(45) Date of Patent: Dec. 27, 2011

(54) KEYPAD PANEL ASSEMBLY HAVING LATERALLY-ILLUMINATED KEYPAD SURFACE

(75) Inventor: Ching-Chih Huang, Taoyuan (TW)

(73) Assignee: Ichia Technologies, Inc., Taoyuan (TW)

( * ) Notice: Subject to any disclaimer, the term of this patent is extended or adjusted under 35 U.S.C. 154(b) by 801 days.

(21) Appl. No.: 11/947,821

(22) Filed: Nov. 30, 2007

(65) Prior Publication Data

US 2009/0122016 A1 May 14, 2009

(30) Foreign Application Priority Data

Nov. 14, 2007 (TW) .............................. 96219235 A

(51) Int. Cl.
*G09G 5/00* (2006.01)
*G06F 3/02* (2006.01)

(52) U.S. Cl. ........................ 345/170; 341/22; 200/5 A

(58) Field of Classification Search .................. 345/168, 345/169, 170; 341/22; 200/5 R, 5 A, 5 B, 200/1 TK
See application file for complete search history.

(56) References Cited

U.S. PATENT DOCUMENTS

| | | | |
|---|---|---|---|
| 5,280,145 A * | 1/1994 | Mosier et al. ................. | 200/313 |
| 6,677,931 B2 * | 1/2004 | Chi et al. ...................... | 345/170 |
| 6,806,815 B1 | 10/2004 | Kaikuranta | |
| 7,070,349 B2 | 7/2006 | Dombrowski | |
| 2007/0023262 A1 * | 2/2007 | Liu et al. ....................... | 200/5 R |
| 2007/0257822 A1 * | 11/2007 | Lee et al. ......................... | 341/22 |

* cited by examiner

*Primary Examiner* — Stephen Sherman
(74) *Attorney, Agent, or Firm* — Chun-Ming Shih; HDLS IPR Services

(57) ABSTRACT

A keypad panel assembly having a laterally-illuminated keypad surface is arranged on an electronic device. The keypad panel includes a light-guiding plate and a panel. The light-guiding plate has a carrier thereon. One side surface of the carrier is provided with a plurality of protruding strips. Each protruding strip is provided with a plurality of light-guiding particles at positions corresponding to the other side surface of the carrier. The top surface of the protruding strip is provided with a reflective layer. The panel is arranged on one side surface of the carrier, and is provided thereon with a plurality of rectangular keypads. One side surface of each keypad is provided with an icon, and a plurality of hollowed portions is provided between each keypad and the panel. Each hollowed portion encloses a rectangular shape and corresponds to the protruding strip of the carrier. After the protruding strip passes through the hollowed portion, the height of the protruding strip is larger than those of the keypad and the icon. After the light generated by a backlight source of the electronic device is introduced from one side of the light-guiding plate, the light-guiding particles focus the light on the protruding strip. Then, the light illuminates the keypad surface from both sides of the protruding strip, so that a user can see the icon displayed on the keypad surface clearly.

9 Claims, 9 Drawing Sheets

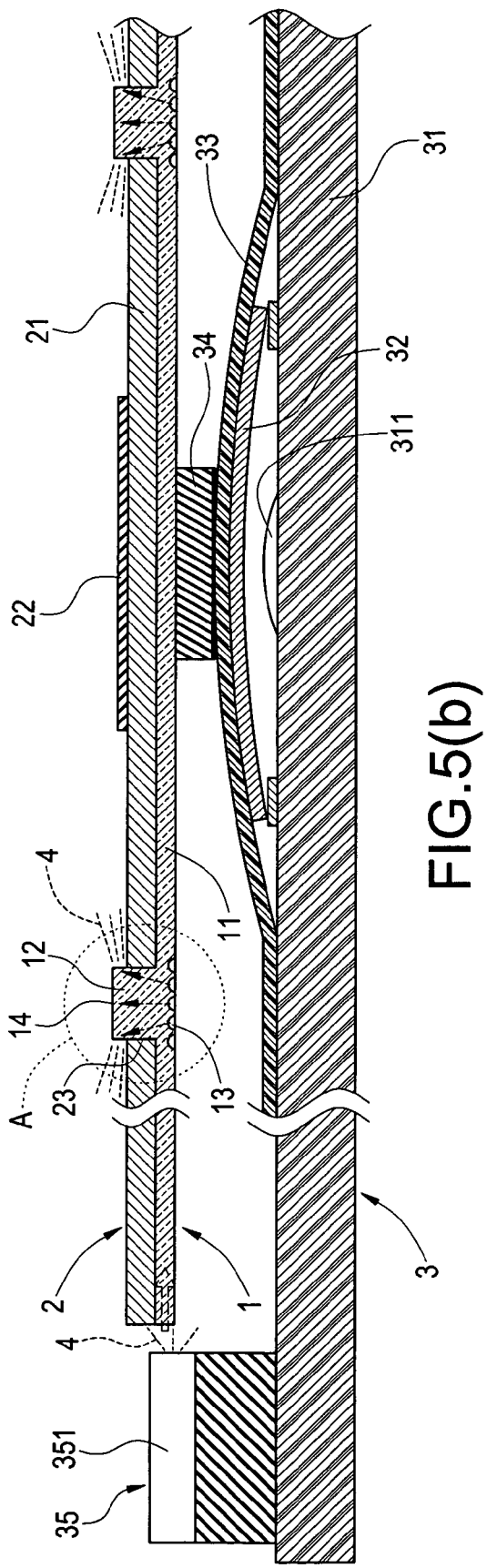
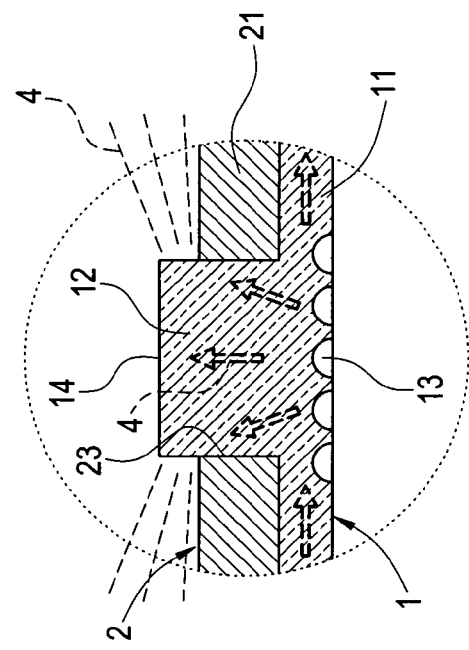
FIG.5(b)
FIG.5(c)

KEYPAD PANEL ASSEMBLY HAVING LATERALLY-ILLUMINATED KEYPAD SURFACE

BACKGROUND OF THE INVENTION

1. Field of the Invention

The present invention relates to a keypad panel, and in particular to a keypad panel assembly having a laterally-illuminated keypad surface.

2. Description of Prior Art

Keypad assembly is one of the primary input means for an electronic device. The surface of each keypad of the keypad assembly is provided with corresponding numerals, characters, phonetic symbols, roots for an input method and various functional icons, so that a user can input data or perform various functions of the electronic device. Therefore, for an electronic device, the keypad assembly is a very important input means.

When the electronic device is operated in an environment having sufficient illumination, the user can see the location of each keypad very clearly, so that the user will not press the wrong keypad in operation. However, in a dark or insufficiently-illuminated environment, it is difficult for the user to operate the keypads on the electronic device. Therefore, a backlight model is arranged in an inner layer of the keypad assembly. The light generated by the backlight model allows the user to see the location of each keypad and the icon displayed on the keypad surface very clearly even in a dark environment.

With reference to FIG. 1, the backlight model used in a traditional keypad assembly at least includes a light-guiding plate 10 and a light-emitting diode (electroluminescent plate) 20. When the electronic device is activated, after the light-emitting diode 20 is lighted up, the light 201 can be introduced from one side (or bottom) of the light-guiding plate 10, and then the light-guiding plate 10 projects the light on the bottom of each keypad 30. In this way, the light 201 passes through an icon 301 on the surface of the keypad 30 so as to display the icon 301 on the surface of the keypad 30, thereby avoiding the user from pressing the wrong keypad 30.

In order to allow the light to pass through the surface of the keypad 30 from the bottom of the keypad 30, the icon 301 on the surface of the keypad 30 is subjected to an etching or punching process to form a hollowed portion. Alternatively, via a printing or electroplating technique, a light-transmitting ink or color layer can be formed on the main body of the transparent keypad 30. As a result, the working hours and number of processes for manufacturing the keypads will be increased, which also increases the cost.

SUMMARY OF THE INVENTION

In view of the above drawbacks, the present invention is to provide a keypad panel assembly in which a backlight effect illuminates the keypad surface form one side of the keypad and which allows the structure of a keypad panel having a backlight effect to be manufactured easily. Further, the present invention can improve the backlight effect, so that a user can see the location of each keypad more clearly.

The present invention is to provide a keypad panel assembly having a laterally-illuminated keypad surface, which includes a light-guiding plate and a panel. The light-guiding plate has a carrier thereon. One side surface of the carrier is provided with a plurality of protruding strips. Each of the protruding strips encloses a rectangular shape. Each protruding strip is provided with a plurality of light-guiding particles at positions corresponding to the other side surface of the carrier. The light-guiding particle is provided in the interior of the carrier, or can be protruded from the carrier. Further, the top surface of the protruding strip is provided with a reflective layer (or a light-shielding layer). The panel is arranged on one side surface of the carrier, and is provided thereon with a plurality of rectangular keypads. One side surface of each keypad is provided with an icon, and a plurality of hollowed portions is provided between each keypad and the panel. Each hollowed portion encloses a rectangular shape and corresponds to the protruding strip of the carrier. After the protruding strip passes through the hollowed portion, the height of the protruding strip is larger than those of the keypad and the icon.

BRIEF DESCRIPTION OF THE DRAWINGS

FIG. 5(b) is a side view showing the keypad panel of the present invention is arranged with a telecommunication model;

FIG. 5(c) is a partially enlarged view of FIG. 5(b);

DETAILED DESCRIPTION OF THE INVENTION

The detailed description and the technical contents of the present invention will be explained with reference to the accompanying drawings.

Figure 1:
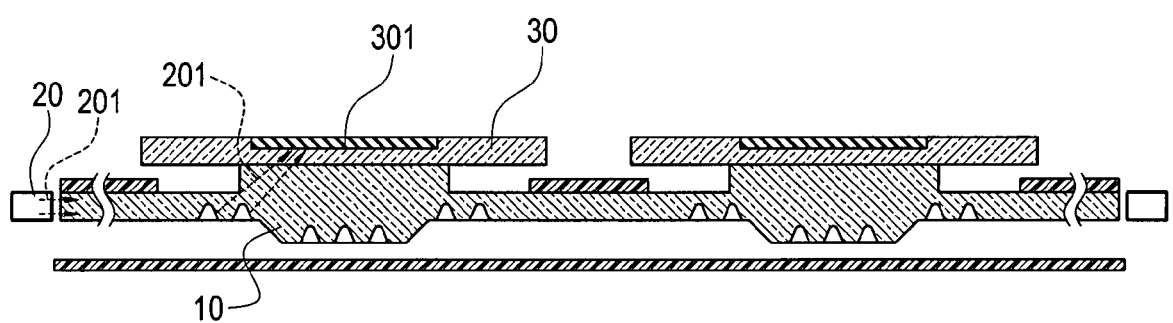
FIG. 1 is a schematic view showing the structure of a traditional metallic keypad panel.
Figure 2:
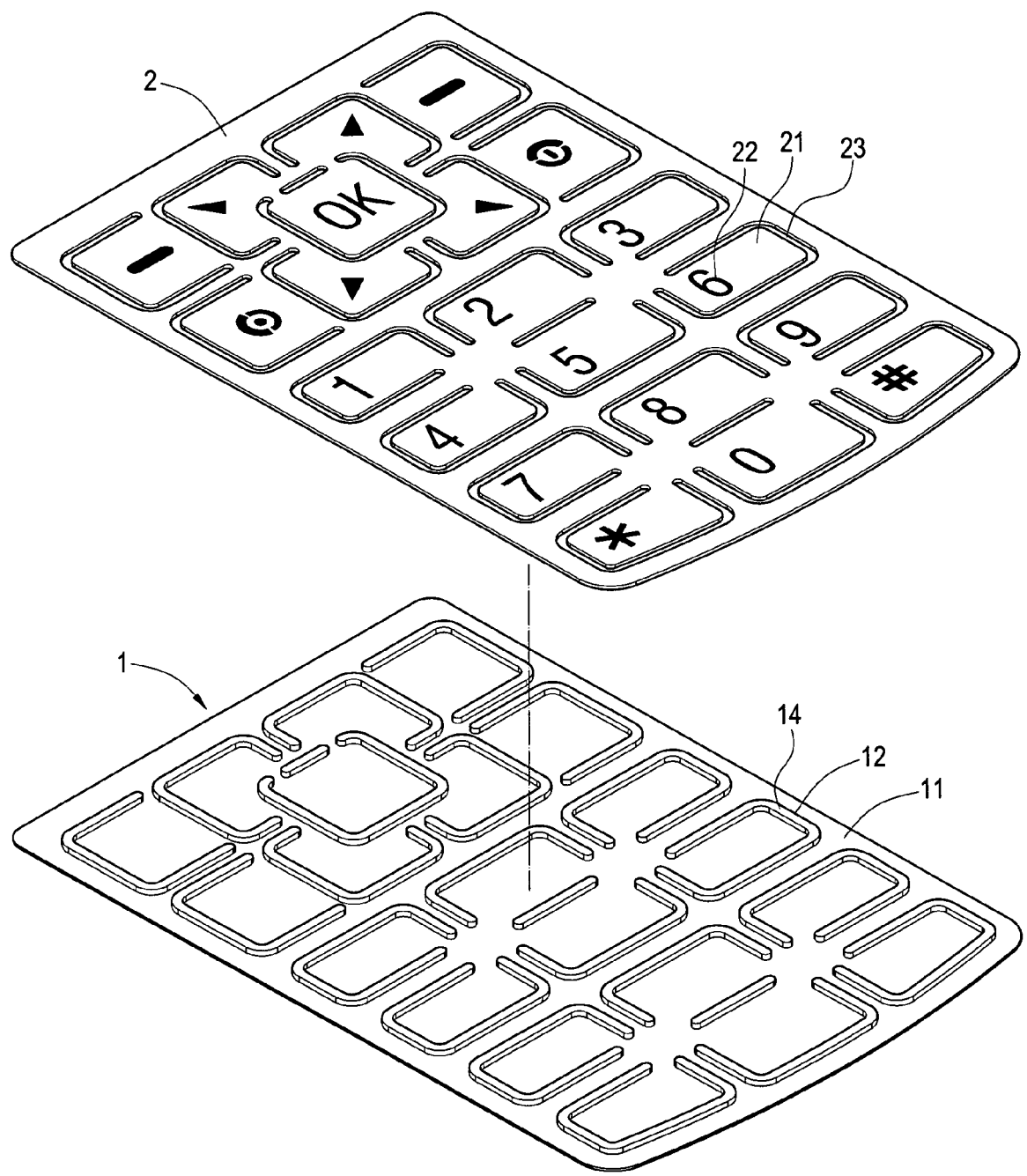
FIG. 2 is an exploded view showing the keypad panel of the present invention.
Figure 3:
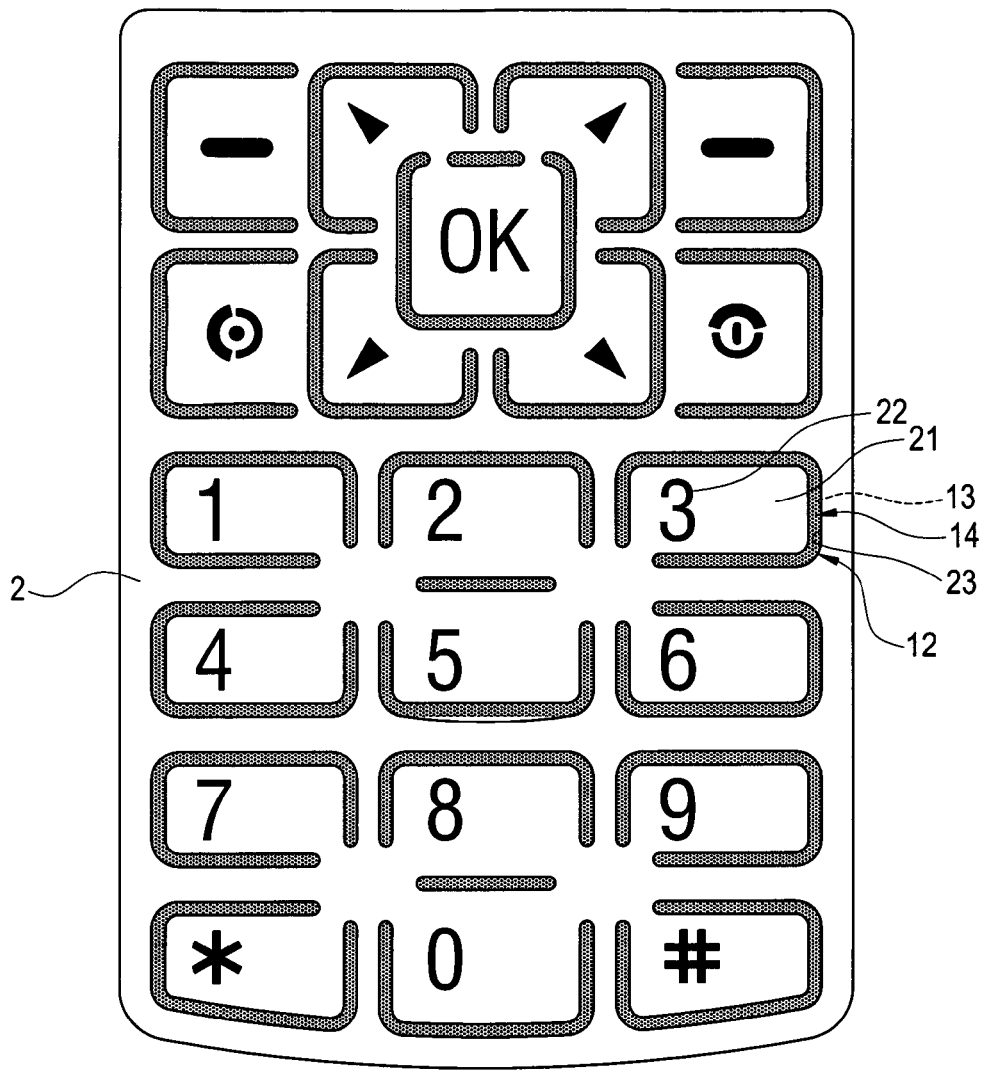
FIG. 3 is an elevation view showing the keypad panel of the present invention.
Figure 4:
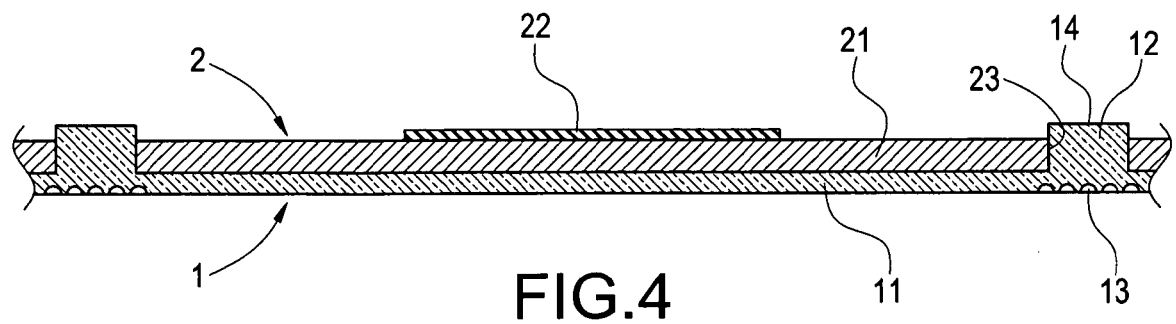
FIG. 4 is a side cross-sectional view showing the keypad panel of the present invention.

FIGS. 2 to 4 are an exploded view, an elevation view and a side cross-sectional view showing the keypad panel assembly of the present invention respectively. As shown in these figures, the present invention provides a keypad panel assembly having a laterally-illuminated keypad surface, which includes a light-guiding plate 1 and a panel 2.

The light-guiding plate 1 is made of either plastic material or rubber material. The light-guiding plate 1 has a carrier 11 thereon. The front surface of the carrier 11 is provided thereon with a plurality of protruding strips 12. Each protruding strip 12 encloses a rectangular shape, so that each protruding strip is provided with a plurality of light-guiding particles 13 at positions corresponding to a back surface of the carrier 11. The light-guiding particles 13 can be provided in the interior of the carrier 11, or can be protruded from the carrier 11. Further, the top surface of the protruding strip 12 is provided with a reflective layer (or light-shielding layer) 14. When the light (not shown) illuminates the reflective layer 14, the reflective layer 14 can reflect the light.

The panel 2 is made of either metallic material or plastic material. The panel 2 is arranged on the front surface of the carrier 11 and is provided with a plurality of rectangular keypads 21 thereon. One side surface of each keypad 21 is provided with an icon 22. The icon 22 includes any one of numerals (0 to 9), characters (A to Z), special symbols (e.g., "#", "*", "." etc.), dialing icon, ending icon and navigational symbols. Further, a plurality of hollowed portions 23 are provided between each keypad 21 and the panel 2. Each hollowed portion 23 encloses a rectangular shape and corresponds to the protruding strip 12 on the front surface of the carrier 11. After the protruding strip 12 passes through the hollowed portion 23, the height of the protruding strip 12 is larger than those of the keypad 21 and the icon 22.

Figure 5A:
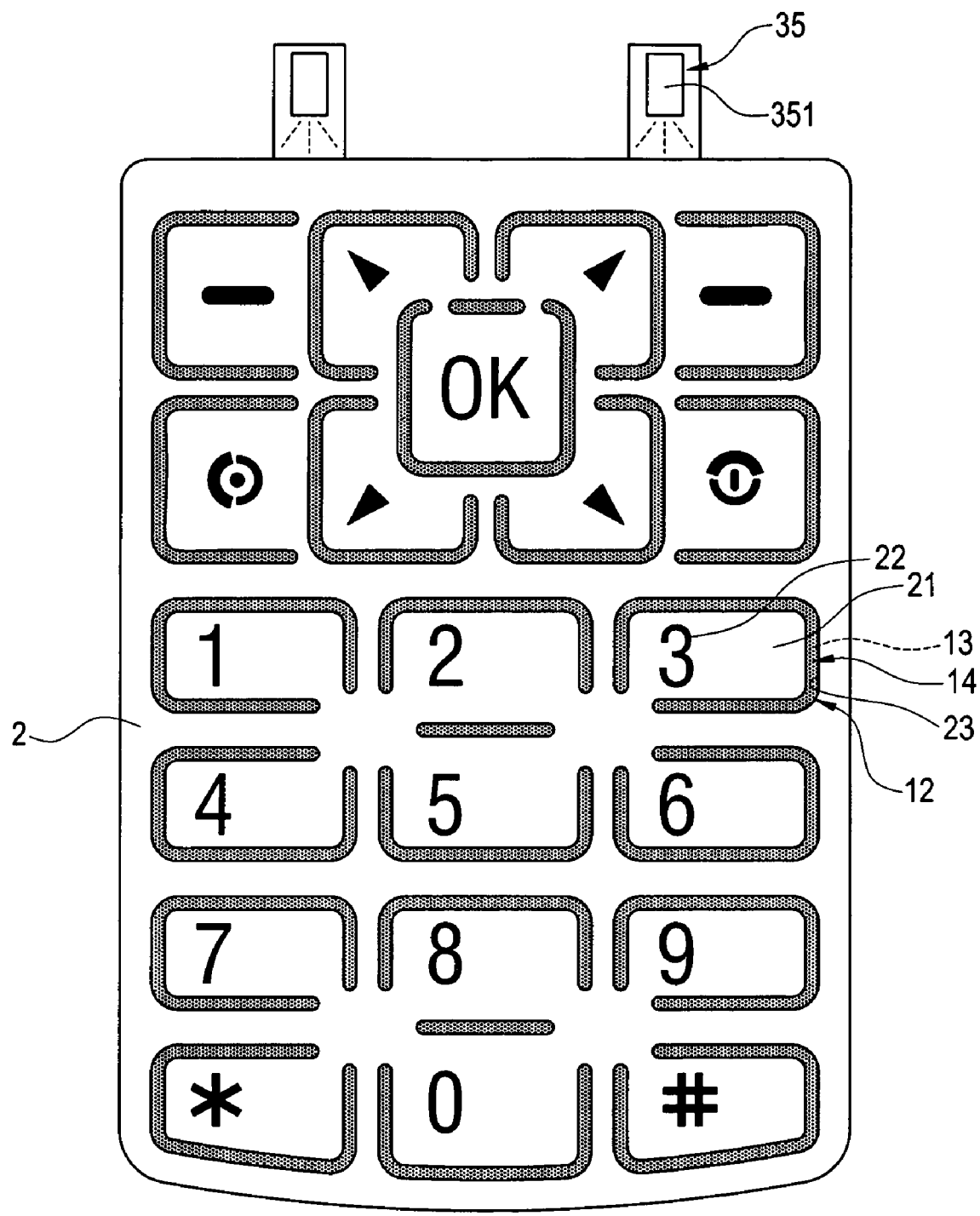
FIG. 5(a) is a schematic view showing the keypad panel of the present invention is arranged with a telecommunication model.

FIG. 5(a) is a schematic view showing the keypad panel of the present invention is arranged with a telecommunication model, and FIG. 5(b) is a side view showing the keypad panel of the present invention is arranged with a telecommunication model. FIG. 5(c) is a partially enlarged view of FIG. 5(b). As shown in these figures, when the keypad panel is combined with a telecommunication model 3, the telecommunication 3 is adhered on one side surface of the light-guiding plate 1. The telecommunication model 3 has a flexible printed circuit board (FPCB) 31. The circuit board 31 is provided thereon with a plurality of contacting points 311. Each of the contacting points 311 corresponds to a metal dome 32. Further, one side surface of the circuit board 31 and the metal dome 32 is provided with a dome sheet 33. The dome sheet 33 is provided with a plurality of protrusions 34. The protrusion 34 corresponds to each keypad 21 of the panel 2.

Further, an end surface of the circuit board 31 is provided with a light source set 35. The light source set 35 is constituted of a plurality of light-emitting diodes 351. The location of the light source generated by the light-emitting diode 351 corresponds to one side of the light-guiding plate 1.

When the electronic device is activated, the light 4 generated by the light-emitting diodes 351 of the light source set 35 on the circuit board 31 can be introduced from one side of the light-guiding plate 1. After the light 4 passes through the light-guiding particles 13 of the light-guiding plate 1, the light-guiding particles 13 can focus the light 4 on the protruding strip 12. After the light 4 is reflected by the reflective layer 14, the light can illuminate the surface of the keypad 21 from both sides of the protruding strip 12, so that the user can see the icon 22 displayed on the surface of the keypad 21 very clearly.

Figure 6:
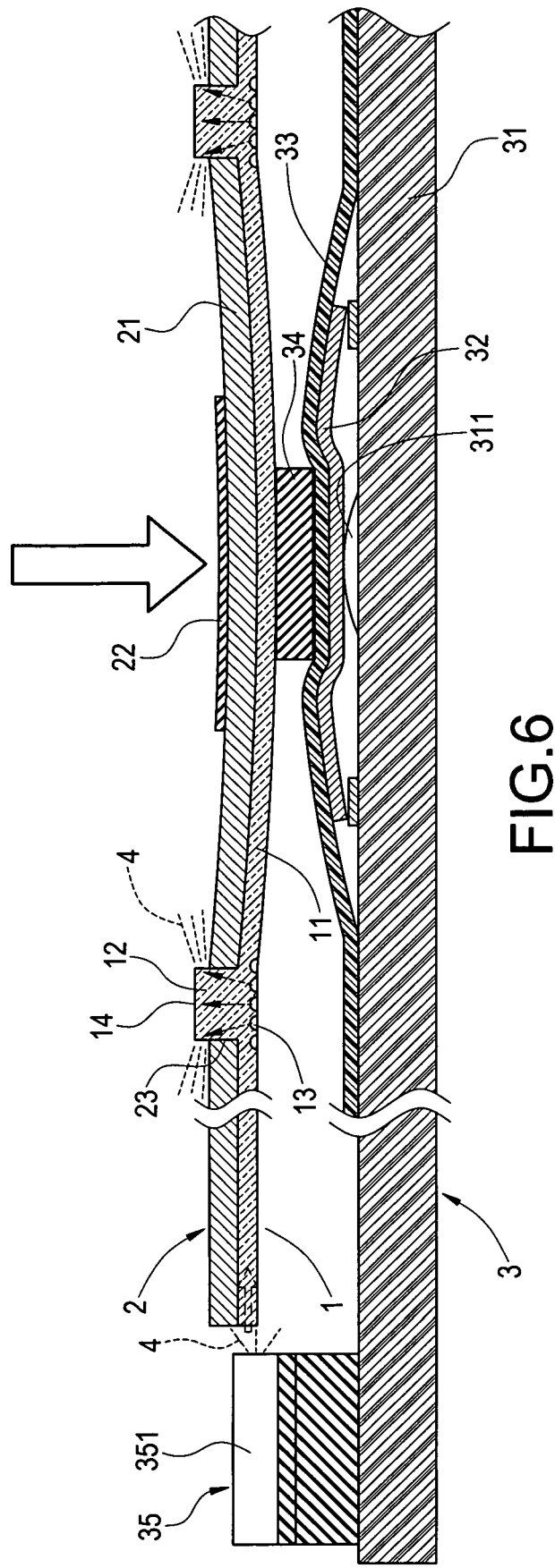
FIG. 6 is a schematic view showing the operation of the keypad panel of the present invention.

With reference to FIG. 6, it is a schematic view showing the keypad panel of the present invention being pressed. As shown in this figure, when the surface of the keypad 21 of the panel 2 is pressed by an external force, the keypad 21 is deformed, causing the protrusion 34 to abut against the dome sheet 33. As a result, the metal dome 32 is deformed to contact the contacting point 311, thereby generating a conductive signal output.

When the surface of the keypad 21 is not pressed by an external force, the elasticity of the materials of the panel 2 and the metal dome 32 allows the keypad 21 to rise automatically, thereby returning to its original state.

Figure 7:
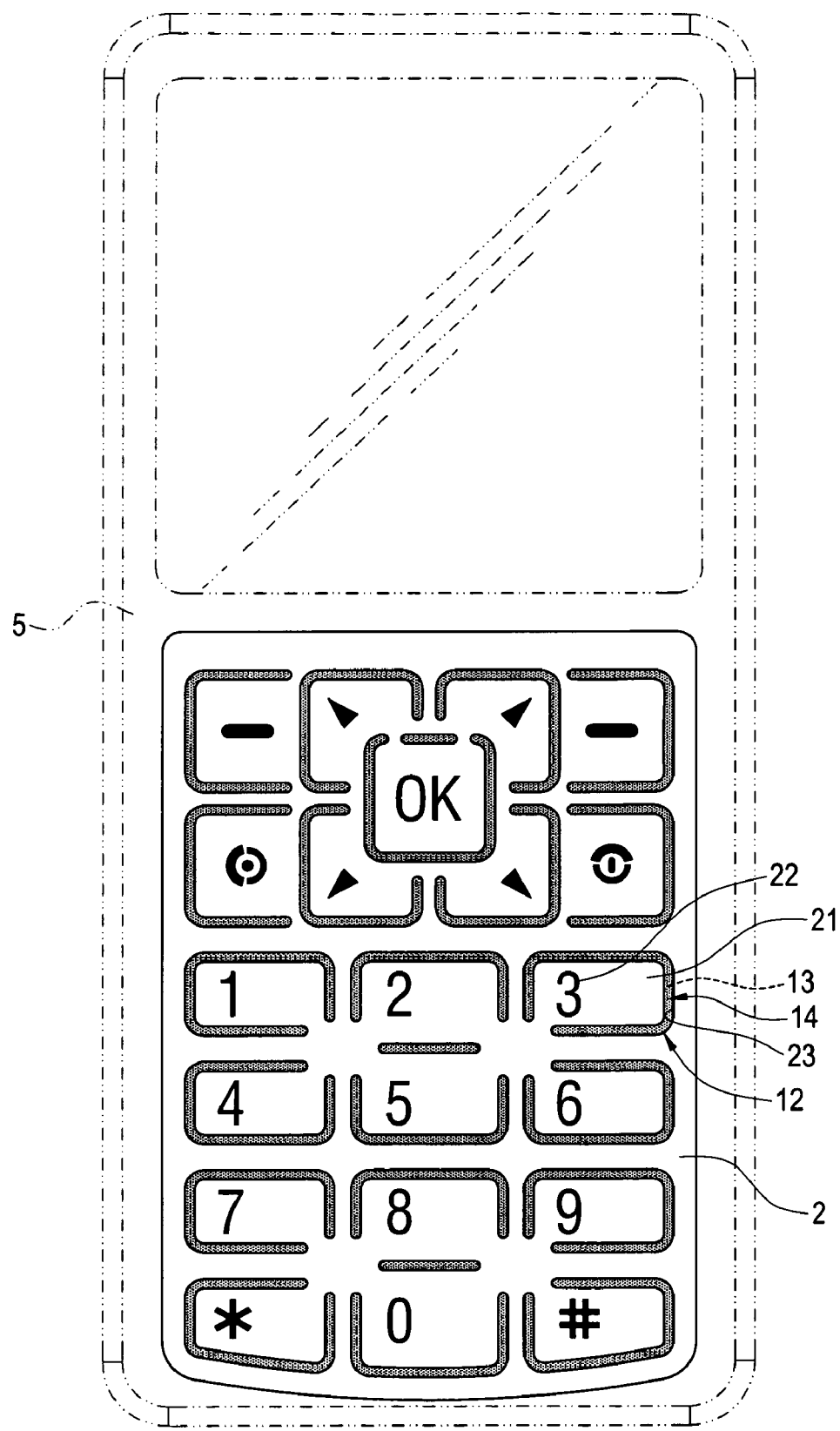
FIG. 7 is a schematic view showing the keypad panel of the present invention being used in a mobile phone.

With reference to FIG. 7, it is a schematic view showing the keypad panel of the present invention being used in a mobile phone. As shown in this figure, when the keypad panel of the present invention is mounted on a mobile phone 5 for use, after the light is introduced into the light-guiding plate 1, the light illuminates the surface of the keypad 21 from both sides of the protruding strip 12. Therefore, the user can see the icon 22 displayed on the surface of the keypad 21 clearly, and in addition, the aesthetic feeling of the mobile phone 5 can be increased.

Figure 8:
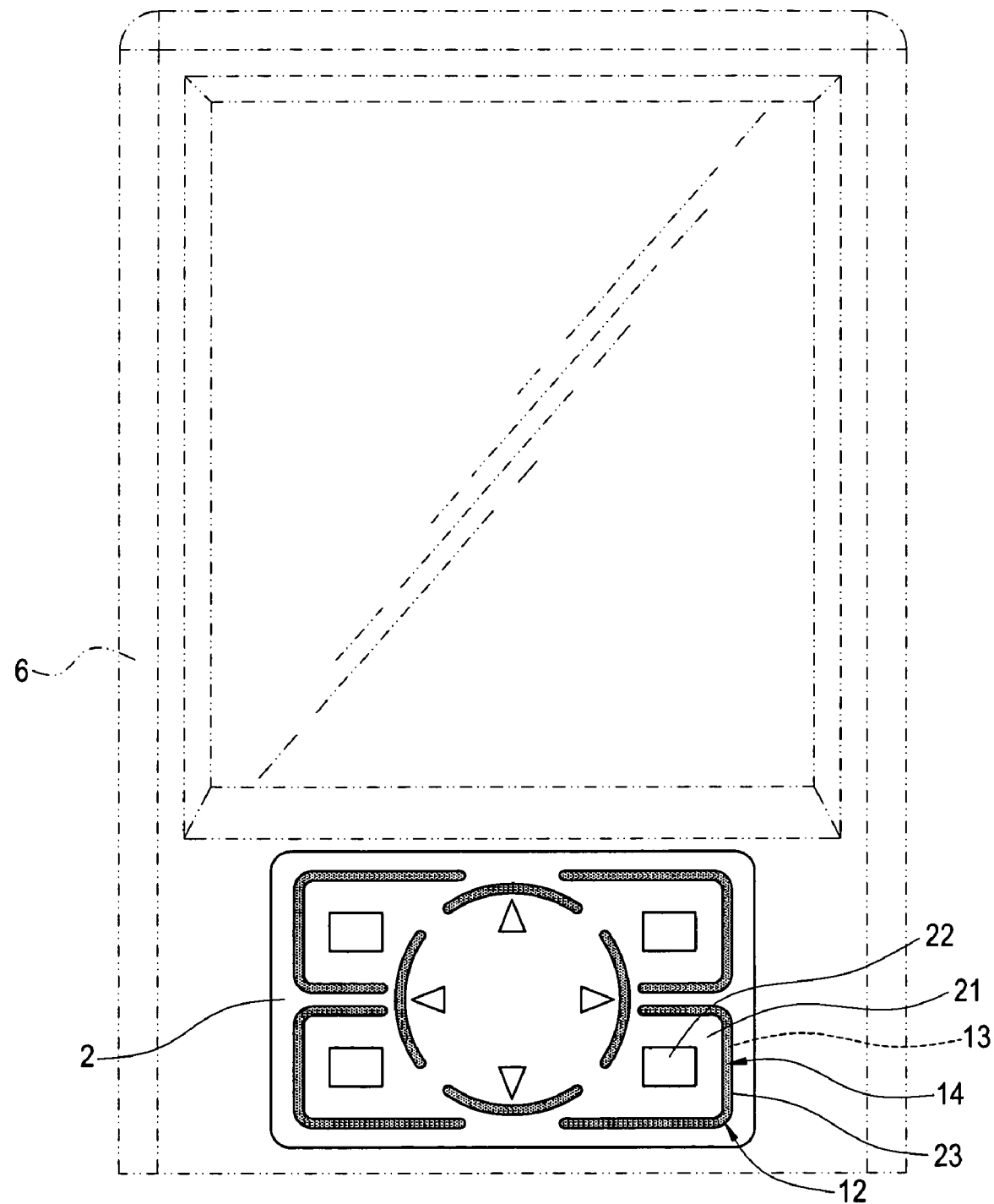
FIG. 8 is a schematic view showing the keypad panel of the present invention being used in a personal digital assistant (PDA)

With reference to FIG. 8, it is a schematic view showing the keypad panel of the present invention being used in a personal digital assistant (PDA). As shown in this figure, in addition to the mobile phone 5, the keypad panel of the present invention can be applied to a personal digital assistant (PDA) 6. After the light is introduced into the light-guiding plate 1, the light illuminates the surface of the keypad 21 from both sides of the protruding strip 12. Therefore, the user can see the icon 22 displayed on the surface of the keypad 21 clearly, and in addition, the aesthetic feeling of the personal digital assistant (PDA) 6 can be increased.

Figure 9:
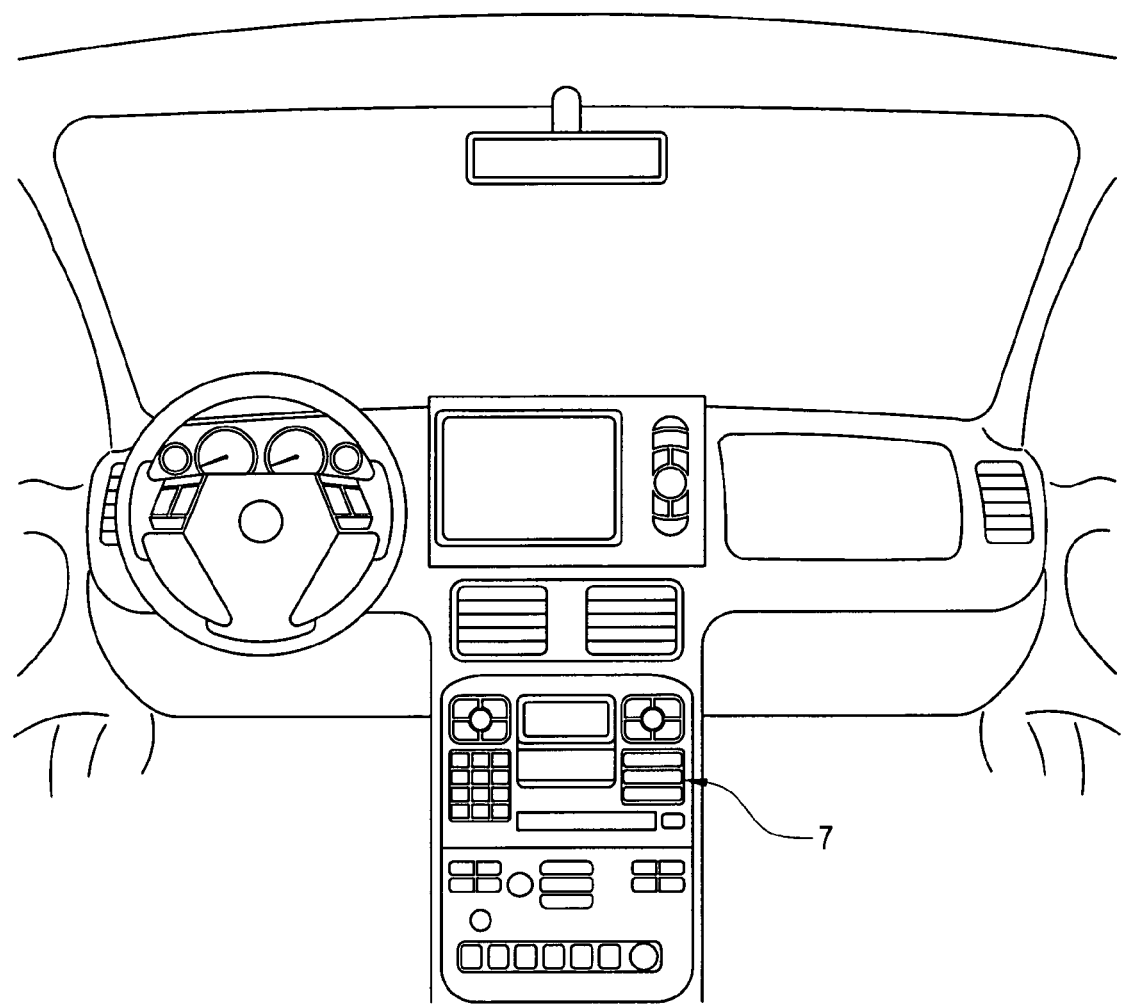
FIG. 9 is a schematic view showing the keypad panel of the present invention being used in an automobile stereo panel.

With reference to FIG. 9, it is a schematic view showing the keypad of the present invention being used in an automobile stereo panel. As shown in this figure, in addition to the mobile phone 5 and the personal digital assistant (PDA) 6, the keypad assembly of the present invention can be mounted on an automobile stereo panel 7, thereby controlling the operations of an air conditioning system, audio-video system and satellite navigation system.

Although the present invention has been described with reference to the foregoing preferred embodiments, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A keypad panel assembly having a laterally-illuminated keypad surface, arranged on an electronic device and comprising:
    a light-guiding plate having a carrier thereon, a front surface of the carrier being provided with a plurality of protruding strips, each protruding strip enclosing a rectangular shape and a top surface of the protruding strip being provided with a reflective layer or a light-shielding layer;
    a plurality of light-guiding particles provided on a back surface and in the interior of the carrier at positions corresponding to each protruding strip; and
    a panel arranged on the front surface of the carrier and provided with a plurality of rectangular keypads thereon, each keypad surface being provided with an icon on top, a plurality of hollowed portions being provided between each keypad and the panel, the hollowed portion encircling a rectangular shape and corresponding to each protruding strip on the front surface of the carrier so that the protruding strip is protruded out of the panel,
    whereby light introduced by the light-guiding plate passes through the light-guiding particles to be focused on the protruding strip and reflected by the reflective layer or the light-shielding layer thereafter, the light illuminates the icon displayed on keypad surface from both sides of the protruding strip.

2. The keypad panel assembly having a laterally-illuminated keypad surface according to claim 1, wherein the light-guiding plate is made of a plastic material.

3. The keypad panel assembly having a laterally-illuminated keypad surface according to claim 1, wherein the light-guiding plate is made of a rubber material.

4. The keypad panel assembly having a laterally-illuminated keypad surface according to claim 1, wherein the panel is made of a metallic material.

5. The keypad panel assembly having a laterally-illuminated keypad surface according to claim 1, wherein the panel is made of a plastic material.

6. The keypad panel assembly having a laterally-illuminated keypad surface according to claim 1, wherein the icon comprises one of numerals (o to 9), characters (A to Z), special symbols ("#", "*", "." etc.), dialing icon, ending icon and navigation symbols.

7. The keypad panel assembly having a laterally-illuminated keypad surface according to claim 1, further comprising a telecommunication model adhered on one side surface of the light-guiding plate.

8. The keypad panel assembly having a laterally-illuminated keypad surface according to claim 7, wherein the telecommunication model has a flexible printed circuit board, the circuit board is provided thereon with a plurality of contacting points, each contacting point corresponds to a metal dome, a dome sheet is provided on one side surface of the circuit board and the metal dome, a plurality of protrusions is provided on the dome sheet, and the protrusion corresponds to each keypad of the panel.

9. The keypad panel assembly having a laterally-illuminated keypad surface according to claim 8, wherein an end surface of the circuit board is provided with a light source set, the light source set is constituted of a plurality of light-emitting diodes, the location of the light source generated by the light-emitting diodes corresponds to one side of the light-guiding plate.

* * * * *